United States Patent [19]

Iimure

[11] Patent Number: 4,961,960

[45] Date of Patent: Oct. 9, 1990

[54] PHOTO-CURABLE COATING COMPOSITIONS

[75] Inventor: Tamio Iimure, Yawata, Japan

[73] Assignee: Nippon Paint Co., Ltd., Osaka, Japan

[21] Appl. No.: 600,042

[22] Filed: Apr. 13, 1984

[30] Foreign Application Priority Data

Oct. 9, 1981 [JP] Japan ................................ 56-161784

[51] Int. Cl.$^5$ ...................... C08F 2/50; C08F 226/02; C08L 63/10; C08L 75/16
[52] U.S. Cl. ................................ 427/54.1; 427/385.5; 522/14; 522/10; 522/81; 522/92; 522/96; 525/920; 525/922; 526/301
[58] Field of Search .................... 522/96, 92; 427/54.1

[56] References Cited

U.S. PATENT DOCUMENTS

| | | | |
|---|---|---|---|
| 3,931,678 | 1/1976 | O'Sullivan | 204/159.23 |
| 4,001,191 | 1/1977 | Reed | 526/301 |
| 4,101,491 | 7/1978 | Tucker | 526/301 |
| 4,108,840 | 8/1978 | Friedlander | 526/301 |
| 4,273,909 | 6/1981 | Arco | 528/45 |
| 4,481,258 | 11/1984 | Sattler | 522/21 |

FOREIGN PATENT DOCUMENTS 2107334  4/1983  United Kingdom .

*Primary Examiner*—Marion C. McCamish
*Assistant Examiner*—Arthur H. Koeckert
*Attorney, Agent, or Firm*—Millen, White & Zelano

[57] ABSTRACT

There is provided a photo-curable coating composition comprising (a) a photo-curable monomer of polymer and (b) a compound having a blocked isocyanate group and at least one ethylenically unsaturated group.

18 Claims, No Drawings

PHOTO-CURABLE COATING COMPOSITIONS

CROSS REFERENCE TO RELATED APPLICATION

This application is a continuation-in-part of Ser. No. 433,592, filed Oct. 8, 1982, now abandoned.

FIELD OF THE INVENTION

This invention relates to a photo-curable coating composition. More particularly it relates to a coating composition which may be cured by irradiation of activating light and then heating to give a cured coating film having good appearance and other properties.

BACKGROUND THE INVENTION

Recently, from the standpoint of economizing natural resources and energy and for the purpose of simplifying coating procedures, it has become attractive in various fields to use photo-curable coating compositions. One of the main characteristics features of photo-curable coating compositions is the fact that they may be cured in a very short period of time without subjecting the object to be coated to unduly high temperatures during the curing step. However, this advantage is incompatible with strength properties required for the finished-cured film since a substnatial amount of stress caused by the rapid contraction of film material during its photo-polymerization remains as an internal stress without being thermally released. This decreases the bonding strength of the finished film particularly upon aging. This greatly limits the field of application of photo-curable coating compositions in practice.

In an attempt to overcome this shortcoming, it has been proposed to treat a photo-cured film with heat to release the internal stress, but this method has been found unsatisfactory. It has been also proposed to add a thermoplastic polymer of a vinyl modified phosphate ester to the photo-curable composition. However, it has been found that these additives adversely affect the co-solubility, shelf life and curability of the coating composition and also the chemical and physical properties of the resulting film.

Japanese Unexamined Patent Publication No. 58733/1979 proposes to add a free polyisocyanate compound to a photo-curable coating composition. However, this isocyanate-containing component must be kept separately and mixed in situ upon use. The mixture has only a very short pot life.

Japanese Unexamined Patent Publication No. 132633/1979 proposes a coating composition containing a photo-curable film-forming polymer having a plurality of active hydrogen atoms and a blocked polyisocyanate compound. Since the blocked polyisocyanate component is not sensitive to activating light, the entire composition is not fully curable upon exposure to the light and a great difference in the degree of polymerization may be seen between the upper and lower layers particularly when the composition is opaque thereby forming a dull finish and wrinkles in the resulting film.

SUMMARY OF THE INVENTION

It is therefore a main object of the present invention to provide an improved photo-curable coating composition which is free of the above-described difficulties.

Other objects and advantages of the present invention will become apparent as the description proceeds.

According to the present invention, there is provided a photo-curable coating composition consisting essentially of (a) a photo-curable monomer or polymer having a plurality of ethylenically unsaturated groups in the molecule, and a compound having a blocked isocyanate group and at least one ethylenically unsaturated group, (b) being an adduct of a polyisocyanate compound, an isocyanate group-blocking agent and a photo-polymerizable alcohol having at least one ethylenically unsaturated group; said component (a) being free of free or blocked isocyanate group; the total number of ethylenically unsaturated groups per molecule possessed by said components (a) and (b) being at least 4.

DESCRIPTION OF THE INVENTION

The coating composition has a good mutual solubility and storage-stability and may be easily cured by exposure to activating light such as UV light followed by a heat treatment to give a rigid film having improved physical and chemical properties such as bonding strength, workability and the like.

The photo-curable composition of this invention may also comprise other conventional ingredients including photo-sensitizers such as benzophenone, benzil, benzoin isopropyl ether, xanthone, thioxanthone and the like, auxiliary photo-sensitizers such as morpholine, triethanolamine, methyl diethanolamine, isoamyl p-dimethylaminobenzoate and the like, pigments such as titanium dioxide, red iron oxide, carbon black, phthalocyanine pigments, yellow azo pigments, red azo pigments and the like, conventional dyes, volatile organic solvents free of active hydrogen atom, conventional fillers and other conventional additives.

Examples of photo-curable monomers or polymers (a) which may or may not have an active hydrogen atom include unsaturated polyester resins, unsaturated polyurethane resins, unsaturated acrylic resins, unsaturated alkyd resins, unsaturated epoxy resins and polyfunctional monomers such as diallyl phthalate, bis(2-acryloxyethoxyethyl)phthalate, trimethylolpropane triacrylate, pentaerythritol tetracrylate and the like. These polymers and monomers must have at least two ethylenically unsaturated groups in the molecule and are well-known in the art.

The compound (b) used in the present invention and having a blocked isocyanate group and at least one ethylenically unsaturated group may be an adduct of a polyisocyanate compound, an isocyanate group-blocking agent and a polymerizable unsaturated alcohol.

Examples of polyisocyanate compounds include dimethylenediisocyanate, tetramethylenediisocyanate, hexamethylenediisocyanate, dimer acid diisocyanate, isophoronediisocyanate, xylylenediisocyanate, tolylenediisocyanate, polymers of these isocyanate compounds, their condensates with water, or their adducts with trimethylolethane or trimethylolpropane.

Various isocyanate group-blocking agents are known in the art and include secondary or tertiary alcohols such as isopropanol and tertiary butanol, active methylene compounds such as dialkyl malonate, acetylacetone and alkyl acetoacetate, oximes such as acetoxime, methyl ethyl ketoxime and cyclohexanone oxime, lactams such as ε-caprolactam, phenols such as phenol, chlorophenol, cresol, p-tert.-butylphenol, p-sec.-butylphenol, p-sec.-amylphenol, p-octylphenol and p-nonylphenol, heterocyclic hydroxyl compounds such as 3-hydroxypyridine, 8-hydroxyquinoline, 8-hydroxyquinaldine and the like.

Examples of polymerizable unsaturated alcohols having at least one active hydrogen atom and at least one polymerizable unsaturated bond include 2-hydroxyethyl acrylate, hexanediol monoacrylate, glycerol diacrylate, pentaerythritol triacrylate, a methacrylate corresponding to these esters, allyl alcohol, or a bisphenol A epoxy resin/acrylic acid adduct and the like.

These three reaction components are reacted in the presence of a catalyst such as benzyl dimethylamine or other tertiary amines, tin octanoate, dibutyltin dilaurate, lead naphthenate and the like until all free isocyanate groups are reacted.

It is important for the composition of this invention that the total number of ethylenically unsaturated groups per molecule possessed by the components (a) and (b) is at least 4. When the total number of ethylenically unsaturated groups is less than 4, it has been often experienced that the coating composition is not fully cured by the irradiation of UV light particularly when the coating composition is pigmented. For this reason, an adduct of a diisocyanate, an isocyanate group-blocking agent and a monoethylenically unsaturated alcohol, for example, may be combined with a photo-curable monomer of polymer having three or more ethylenically unsaturated groups. On the other hand, a photo-curable monomer or polymer having only two ethylenically unsaturated groups such as diallyl phthalate may be combined with, for example, an adduct of a diisocyanate, an isocyanate group-blocking agent and an alcohol having at least two ethylenically unsaturated group such as pentaerythritol triacrylate.

The ratio of the number of blocked isocyanate groups (A) to the number of ethylenically unsaturated groups (B) per molecule possessed by the resulting adduct (b) is preferably between 0.01 and 10. Also, the proportion of the components (a) and (b) in the coating composition is preferably adjusted so that the blocked isocyanate equivalent ranges between 0.02 and 5 per 1,000 g of their mixture on dry basis. If the ratio of A/B is less than 0.01 and the blocked isocyanate equivalent is less than 0.02, the performance of the coating film will not be improved upon heating, whereas a ratio A/B greater than 10 and an blocked isocyanate equivalent greater than 5 will result in a poor photo-curability and will not give a glossy smooth film particularly when the composition is opaque.

The coating composition of the present invention may be cured by irradiating a light beam having a wavelength from 200 to 500 nm. Any conventional light source may be employed including carbon arc lamps, high voltage mercury lamps, metal halide lamps and the like.

After irradiating activating light, the film may be heated at a temperature above 100° C. for a period over 10 seconds. Any heating means such as a hot air oven, an IR lamp oven or an RF oven may be employed. A heating condition of at least 100° C. for 10 seconds is needed to improve the performance of the finished coating film. The upper limit of heating temperature and length of time is of course limited by various factors such as the color-changing point, thermal deterioration point and decomposition point of the film and also by the heat durability of the object to be coated.

The photo-curable coating composition of the present invention exhibits an excellent photo-curability to UV light and a long term storage stability and may give a rigid film having a good bonding property and workability after the photo-curing step followed by the heat treatment step. Therefore, the composition may be applied not only as a transparent coating but also as an opaque coating having a high masking power and workability. The composition may also find uses in other fields such as adhesives, sealants and the like.

The following examples are intended to illustrate the present invention in further detail. In these exmaples, all parts and percents are by weight.

PRODUCTION EXAMPLE 1

A flask equipped with a stirrer was charged with 378 parts of an epoxy resin (EPIKOTE 828, Shell Chemical), 2.6 parts of diethylaminoethyl methacrylate, 1 part of hydroquinone and 131 parts of cellosolve acetate. To the flask were added 144 parts of acrylic acid dropwise at 120° C. over about two hours. The mixture was reacted at the same temperature until the acid number was below 8 to give a photo-curable polymer.

PRODUCTION EXAMPLE 2

A flask equipped with a stirrer was charged with 188 parts of xylylenediisocyanate (a mixture of 1,3- and 1,4-isomers) and 69 parts of cellosolve acetate. To the flask were added 87 parts of methyl ethyl ketoxime dropwise at a temperature of 30° to 80° C. over about 1 hour. The mixture was stirred for 30 minutes at the same temperature. To the mixture were added 656.6 parts of a photo-curable polymer produced in Production Example 1 and 0.5 parts of dibutyltin dilaurate. The mixture was reacted at the same temperature with stirring until no free isocyanate group was detected when tested IR spectrometrically. A photo-curable polymer containing blocked isocyanate groups was obtained.

PRODUCTION EXAMPLE 3

A flask equipped with a stirrer was charged with 741 parts of a hexamethylenediisocyanate/water condensate (DESMODUR N, Bayer) and 41 parts of cellosolve acetate. 87 parts of methyl ethyl ketoxime were added dropwise at a temperature of 30° to 80° C. over about 1 hour and the mixture was stirred for 30 minutes at the same temperature. To the mixture were added 0.6 parts of dibutyltin dilaurate and 260 parts of 2-hydroxyethyl acrylate dropwise at the same temperature over about 1 hour. The mixture was stirred at the same temperature until no free isocyanate group was detected when tested IR spectrometrically. A photo-curable compound containing blocked isocyanate groups was obtained.

PRODUCTION EXAMPLE 4

A flask equipped with a stirrer was charged with 741 parts of DESMODUR N and 19 parts of cellosolve acetate. To the mixture were added dropwise 261 parts of methyl ethylketoxime at a temperature of 30 to 80° C over about 1 hour. The mixture was reacted with stirring at the same temperature until no free isocyanate group was detected when tested IR spectrometrically. A blocked polyisocyanate compound was obtained.

PRODUCTION EXAMPLE 5

A flask equipped with a stirrer was charged with 222 parts of isophoronediisocyanate, 113 parts of ε-caprolactam, 0.3 parts of dibutyltin dilaurate and 113 parts of cellosolve acetate. The mixture was stirred at 100° C. for 2 hours and then cooled to 80° C. 116 parts of 2-hydroxyethyl acrylate were added dropwise over 30 minutes. The mixture was reacted at the same temperature with stirring until no free isocyanate group was detected when tested IR spectrometrically. A photo-curable compound containing blocked isocyanate groups was obtained.

PRODUCTION EXAMPLE 6

A flask equipped with a stirrer was charged with 222 parts of isophoronediisocyanate, 226 parts of ε-caprolactam, 0.3 parts of dibutyltin dilaurate and 112 parts of cellosolve acetate. The mixture was reacted at 100° C. with stirring until no free isocyanate group was detected when tested IR spectrometrically. A blocked polyisocyanate compound was obtained.

PRODUCTION EXAMPLE 7

A flask equipped with a stirrer was charged with 188 parts of xylylenediisocyanate, 218 parts of cellosolve acetate and 0.5 parts of dibutyltin dilaurate. To the mixture were added 87 parts of methyl ethyl ketoxime at a temperature of 30° to 50° C. over about 1 hour and the mixture was stirred for 30 minutes at the same temperature. 596 parts of pentaerythritol triacrylate (VISCOAT 300, Osaka Yuki Co., LTD.) were added dropwise over about 2 hours and the mixture was reacted with stirring at the same temperature until no free isocyanate group was detected when tested IR spectrometrically. A photo-curable compound containing blocked isocyanate groups was obtained.

PRODUCTION EXAMPLE 8

A flask equipped with a stirrer was charged with 188 parts of xylylenediisocyanate and 91 parts of cellosolve acetate. To the flask were added dropwise 174 parts of methyl ethyl ketoxime at a temperature of 30° to 80° C. over about 1 hour.

The mixture was reacted with stirring at the same temperature until no free isocyanate group was detected when tested IR spectrometrically. A blocked polyisocyanate compound was obtained.

EXAMPLE 1

A coating composition was prepared by mixing 40 parts of diacrylate of an adduct of 1 mole of Bisphenol A with 4 moles of ethylene oxide (VISCOAT 700, Osaka Yuki Co., Ltd.), 75 parts of a photo-curable polymer produced in Production Example 2, 5 parts of benzophenone, 3 parts of methyl diethanolamine and 0.5 parts of dibutyltin dilaurate.

The composition was applied on a cleaned, polished tempered steel plate of 0.6 mm thickness to a dry film thickness of 30μ using a bar coater. The film was allowed to stand for 2 hours at room temperature to remove the solvent by evaporation, irradiated by a light under the conditions as shown in Table 1, and finally heated at 170° C. for 3 minutes in a hot air oven. The properties of the resulting film are shown in Table 1.

REFERENCE EXAMPLE 1

Example 1 was repeated except that 75 parts of a photo-curable polymer produced in Production Example 1 were replaced for the photo-curable polymer of Production Example 2. The properties of the resulting film are shown in Table 1.

EXAMPLE 2

An opaque coating composition was prepared by milling 20 parts of di-pentaerythritol hexacrylate, 40 parts of bis(2-acryloxyethoxyethyl)phthalate, 50 parts of a photo-curable compound produced in Production Example 3, 120 parts of titanium dioxide (TAIPAQUE R-930, Ishihara Sangyo Co., Ltd.), 3 parts of isoamyl p-dimethylaminobenzoate, 4 parts of benzophenone, 4 parts of benzil and 1.0 part of dibutyltin dilaurate.

The composition was applied on a cleaned, polished tempered steel plate of 0.6 mm thickness to a dry film thickness of 20μ using a bar coater. The film was allowed to stand for 2 hours to remove the solvent by evaporation, irradiated by a light under the conditions as shown in Table 1, and finally heated at 190° C. for 2 minutes in a hot air oven. The properties of the resulting film are shown in Table 1.

REFERENCE EXAMPLE 2

Example 2 was repeated except that 37.5 parts of a blocked polyisocyanate compound prepared in Production Example 4 and 10 parts of 2-hydroxypropyl acrylate were replaced for a photo-curable compound produced in Production Example 3. The properties of the resulting film are shown in the Table 1.

EXAMPLE 3

A coating composition was prepared by milling 30 parts of trimethylolpropane triacrylate, 37.5 parts of a photo-curable polymer produced in Production Example 1, 50 parts of a photo-curable compound containing blocked isocyanate groups produced in Production Example 5, 10 parts of a red pigment (TENYO red iron oxide, Tone Sangyo Co., Ltd.) 5 parts of benzoin isopropyl ether and 0.6 parts of dibutyltin dilaurate.

The composition was applied on a cleaned, polished tempered steel plate of 0.6 mm thickness to a dry film thickness of 20μ using a bar coater. The film was allowed to stand for 2 hours at room temperature to remove the solvent by evaporation, irradiated by a light under the conditions as shown in Table 1, and finally heated at 190° C. for 2 minutes. The properties of the resulting film are shown in Table 1.

REFERENCE EXAMPLE 3

Example 3 was repeated except that 50 parts of the blocked polyisocyanate compound of Production Example 6 were replaced for the photo-curable compound containing blocked isocyanate groups of Production Example 5. The properties of the resulting film are shown in Table 1.

EXAMPLE 4

40 parts of pentaerythritol triacrylate (VISCOAT 300, Osaka Yuki Co., Ltd.), 75 parts of a photo-curable compound containing blocked isocyanate groups produced in Production Example 7, 15 parts of a blue pigment (iron blue N-650, Dainichi Seika Co., Ltd.), 5 parts of benzildimethylketal and 0.6 parts of dibutyltin dilaurate were thoroughly milled to give a photo-curable coating composition.

The composition was applied on a cleaned, polished tempered steel plate of 0.6 mm thickness to a dry film thickness of 20μ using a bar coater. The film was allowed to stand for 2 hours at room temperature to remove the solvent by evaporation, irradiated by a light under the conditions as shown in Table 1, and finally heated at 190° C. for 3 minutes in a hot air oven. The properties of the resulting film are shown in Table 1.

REFERENCE EXAMPLE 4

Example 4 was repeated except that 31 parts of the blocked polyisocyanate compound of Production Example 8 and 35 parts of pentaerythritol triacrylate were replaced for the photo-curable compound containing blocked isocyanate groups of Production Example 7. The properties of the resulting film are shown in Table 1.

TABLE 1

| Example | Light *1 irradiation Conveyer speed, (m/min.) | Photo-cured film Appearance | *2 Hardness | *3 Solvent resistance | Post-heated film Appearance | *2 Hardness | *4 Bonding strength | *5 Flexibility | *6 Cross cut, Erichsen | *7 Impact strength |
|---|---|---|---|---|---|---|---|---|---|---|
| Example 1 | 10 | Good | 2H | No change | Good | 3H | Good | Good | Good | Good |
| Reference Ex. 1 | | Good | H-2H | No change | Good | 3H | Not good | Not good | Not good | Not good |
| Example 2 | 6 | Good | 3H | No change | Good | 4H | Good | Good | Good | Good |
| Reference Ex. 2 | | Dull | 2H | Slightly dissolved | Dull | 3H | Good | Not good | Good | Good |
| Example 3 | 6 | Good | 4H | No change | Good | 4H | Good | Good | Good | Good |
| Reference Ex. 3 | | Wrinkle | B | Completely dissolved | Wrinkle, Dull | H | Good | Not good | Fair | Fair |
| Example 4 | 6 | Good | 3H | No change | Good | 4H | Good | Good | Good | Good |
| Reference Ex. 4 | | Wrinkle, Dull | HB | Slightly dissolved | Dull | 2H | Good | Good | Good | Good |

Remarks

*1, Light irradiation:

A high voltage mercury lamp (Japan Storage Battery Co., Ltd., Model HI-20N, 80 W/cm, equipped with a beam collector as a reflector) was placed over a conveyer at a height of 80 mm in a direction transverse to the moving direction of the conveyer. Samples were conveyed beneath the lamp at a speed shown in Table 1.

*2, Hardness:

Scratch test by the Mitsubishi UNI pencils.

*3, Solvent resistance:

Rubbing test with acetone-impregnated fabric at 50 reciprocations.

*4, Bonding strength:

The film was cut in a grating pattern at a distance of 1 mm. The percent of unpeeled sections was calculated.
Good = >80%
Fair = 79-30%
Not good = <30%

*5, Flexibility:

The steel plate was folded at·360° at a temperature of 20° C. with the coating film facing outwardly. The film was stripped from the folded area using an adhesive tape. The percent of unpeeled area was calculated.
Good = >80%
Fair = 79-30%
Not good = <30%

*6, Cross cut, Erichsen:

The film was cut in a grating pattern at a distance of 1 mm and then the plate was drawn at a depth of 5 mm at a temperature of 20° C. The percent of unpeeled sections was calculated.
Good = >80%
Fair = 79-30%
Not good = <30%

*7, Impact strength:

Du Pont Impact tester was used. The test was carried out at 20° C., at an impact load of 1 kg using a ½ inch diameter hammer, at a drop height of 20 cm.
Good = No change
Fair = Cracked but not peeled.
not good = Peeled.

What is claimed is:

1. A photo-curable coating composition consisting essentially of (a) a photo-curable monomer or polymer having a plurality of ethylenically unsaturated groups in the molecule, and (b) an adduct of a polyisocyanate compound, an isocyanate group-blocking agent and a photo-polymerizable alcohol having at least one ethylenically unsaturated group; said component (a) being free of free or blocked isocyanate groups; wherein the total number of ethylenically unsaturated groups possessed by said components (a) and (b) is at least 4, said composition being photo-curable by activating radiation and subsequently further curable by heat to form a finished film.

2. The photo-curable coating composition of claim 1 wherein said photo-curable monomer or polymer (a) has at least one hydrogen atom active with respect to isocyanate.

3. The photo-curable coating composition of claim 1 wherein the ratio of the number of blocked isocyanate group to the number of ethylenically unsaturated group of said component (b) ranges between 0.01 and 10.

4. The photo-curable coating composition of claim 1 wherein the proportion of said components (a) and (b) is adjusted so that the blocked isocyanate equivalent ranges between 0.02 and 5 per 1,000 g of their mixture on a dry basis.

5. The photo-curable coating composition of claim 1 further comprising a photo-sensitizer, and a volatile solvent free of active hydrogen atoms.

6. The photo-curable coating composition of claim 1 which is opaque to activating light.

7. A composition of claim 1 wherein said polyisocyanate compound is derived from dimethylenediisocyanate, tetramethylenediisocyanate, hexamethylenediisocyanate, dimer acid diisocyanate, isophoronediisocyanate, xylylenediisocyanate, tolylenediisocyanate, polymers of these isocyanate compounds, their condensates with water, or their adducts with trimethylolethane or trimethylolpropane.

8. A composition of claim 7 wherein said polyisocyanate is blocked by a secondary or tertiary alcohol, an active methylene compound, an oxime, a lactam, a phenol or a heterocyclic hydroxyl compound.

9. A composition of claim 8 wherein said polymerizable unsaturated alcohol is 2-hydroxyethyl acrylate, hexanediol monoacrylate, glycerol diacrylate, pentaerythritol triacrylate, a methacrylate corresponding to these esters, allyl alcohol, or a bisphenol A epoxy resin-/acrylic acid adduct.

10. A composition of claim 1, wherein component (a) is a bisphenol A epoxy resin/acrylic acid adduct, diallyl phthalate, bis(2-acryloxyethoxyethyl)phthalate, trimethylpropane triacrylate or pentaerythritol tetracrylate.

11. A composition of claim 8, wherein the isocyanate group blocking agent is isopropanol, tertiary butanol, dialkyl malonate, acetylacetone, alkyl acetoacetate, acetoxime, methyl ethyl ketoxime, cyclohexanone oxime, ε-caprolactam, 3-hydroxy-pyridine, 8-hydroxyquinoline, or 8-hydroxyquinaldine.

12. A composition of claim 8, wherein the isocyanate group blocking agent is phenol, chlorophenol, cresol, p-tertbutylphenol, p-sec-butylphenol, p-sec-amylphenol, p-octylphenol, or p-nonylphenol.

13. A method of forming a protective coating on a surface which comprises the steps of applying the photo-curable coating composition of claim 1 on said surface to form a film, exposing the film to the irradiation of light having a wavelength from 200 to 500 nm for a sufficient length of time to cure the film, and heating the film at a temperature above 100° C. for a period over 10 seconds.

14. A method of claim 13 wherein the photo-curable coating composition of claim 15 is used.

15. A method of forming a protective coating on a surface comprising the steps of applying the photo-curable coating composition of claim 2 on said surface to form a film, exposing the film to the irradiation of light having a wavelength from 200 to 500 nm for a sufficient length of time to cure the film, and heating the film at a temperature above 100° C. for a period over 10 seconds.

16. A method of forming a protective coating on a surface comprising the steps of applying the photo-curable coating composition of claim 3 on said surface to form a film, exposing the film to the irradiation of light having a wavelength from 200 to 500 nm for a sufficient length of time to cure the film, and heating the film at a temperature above 100° C. for a period over 10 seconds.

17. A method of forming a protective coating on a surface comprising the steps of applying the photo-curable coating composition of claim 4 on said surface to form a film, exposing the film to the irradiation of light having a wavelength from 200 to 500 nm for a sufficient length of time to cure the film, and heating the film at a temperature above 100° C. for a period over 10 seconds.

18. A method of forming a protective coating on a surface comprising the steps of applying the photo-curable coating composition of claim 5 on said surface to form a film, exposing the film to the irradiation of light having a wavelength from 200 to 500 nm for a sufficient length of time to cure the film, and heating the film at a temperature above 100° C. for a period over 10 seconds.

* * * * *